(12) United States Patent
Spinelli

(10) Patent No.: US 7,940,300 B2
(45) Date of Patent: *May 10, 2011

(54) AUTOMATIC DOOR ASSEMBLY WITH VIDEO IMAGING DEVICE

(75) Inventor: Vito A. Spinelli, Shelton, CT (US)

(73) Assignee: Stanley Black & Decker, Inc., New Britain, CT (US)

(*) Notice: Subject to any disclaimer, the term of this patent is extended or adjusted under 35 U.S.C. 154(b) by 713 days.

This patent is subject to a terminal disclaimer.

(21) Appl. No.: 11/360,401

(22) Filed: Feb. 24, 2006

(65) Prior Publication Data

US 2006/0139453 A1  Jun. 29, 2006

Related U.S. Application Data

(63) Continuation of application No. 09/729,960, filed on Dec. 6, 2000, now Pat. No. 7,042,492.

(60) Provisional application No. 60/169,977, filed on Dec. 10, 1999.

(51) Int. Cl.
H04N 7/18 (2006.01)

(52) U.S. Cl. ........................................ 348/143; 348/156

(58) Field of Classification Search .................. 348/143, 348/151–155, 169–172; 340/686.6
See application file for complete search history.

(56) References Cited

U.S. PATENT DOCUMENTS

| | | |
|---|---|---|
| 3,857,466 A | 12/1974 | Berkovitz et al. |
| 3,903,996 A | 9/1975 | Berkovitz et al. |
| 4,009,476 A | 2/1977 | Lutz |
| 4,249,207 A | 2/1981 | Harman et al. |
| 4,565,029 A | 1/1986 | Kornbrekke et al. |
| 4,621,452 A | 11/1986 | Deeg |
| 4,698,937 A | 10/1987 | Kornbrekke et al. |
| 4,823,010 A | 4/1989 | Kornbrekke et al. |
| 4,832,158 A | 5/1989 | Farrar et al. |
| 4,843,461 A | 6/1989 | Tatsumi et al. |
| 4,866,881 A | 9/1989 | Morrow et al. |
| 4,914,859 A | 4/1990 | Gionet et al. |
| 4,924,416 A | 5/1990 | Sasao |
| 4,967,083 A | 10/1990 | Kornbrekke et al. |
| 5,001,557 A * | 3/1991 | Begle ............................ 348/166 |
| 5,074,073 A | 12/1991 | Zwebner |
| 5,091,780 A | 2/1992 | Pomerleau |
| 5,142,152 A | 8/1992 | Boiucaner |
| 5,149,921 A | 9/1992 | Picado |
| 5,191,268 A | 3/1993 | Duhame |
| 5,235,143 A | 8/1993 | Bahjat et al. |
| 5,253,070 A | 10/1993 | Hong |
| 5,268,670 A | 12/1993 | Brasch et al. |

(Continued)

FOREIGN PATENT DOCUMENTS

DE  297 01 462 U1  3/1997

(Continued)

OTHER PUBLICATIONS

European Search Report issued for European Patent Application No. 05018666.7, dated Nov. 1, 2007.

(Continued)

*Primary Examiner* — David Czekaj
(74) *Attorney, Agent, or Firm* — Pillsbury Winthrop Shaw Pittman LLP

(57) ABSTRACT

An automatic door assembly is provided for determining whether an individual in a door approach area.

13 Claims, 4 Drawing Sheets

U.S. PATENT DOCUMENTS

| | | | |
|---|---|---|---|
| 5,281,809 A | 1/1994 | Anderson et al. | |
| 5,283,551 A | 2/1994 | Guscott | |
| 5,285,136 A | 2/1994 | Duhame | |
| 5,329,076 A | 7/1994 | Kameli | |
| 5,387,768 A | 2/1995 | Izard et al. | |
| 5,398,057 A | 3/1995 | Tapp | |
| 5,410,149 A | 4/1995 | Winston, Jr. et al. | |
| 5,428,923 A | 7/1995 | Waggamon | |
| 5,448,484 A | 9/1995 | Bullock et al. | |
| 5,487,451 A | 1/1996 | Hughes et al. | |
| 5,512,942 A | 4/1996 | Otsuki | |
| 5,517,429 A | 5/1996 | Harrison | |
| 5,518,086 A * | 5/1996 | Tyni | 187/316 |
| 5,541,585 A * | 7/1996 | Duhame et al. | 340/5.62 |
| 5,576,972 A | 11/1996 | Harrison | |
| 5,581,297 A | 12/1996 | Koz et al. | |
| 5,583,405 A | 12/1996 | Sai et al. | |
| 5,602,585 A | 2/1997 | Dickinson et al. | |
| 5,641,951 A | 6/1997 | Cai et al. | |
| 5,657,076 A | 8/1997 | Tapp | |
| 5,666,157 A | 9/1997 | Aviv | |
| 5,671,009 A | 9/1997 | Chun | |
| 5,734,735 A | 3/1998 | Coleman, Jr. | |
| 5,753,931 A | 5/1998 | Borchers et al. | |
| 5,778,108 A | 7/1998 | Coleman, Jr. | |
| 5,798,787 A | 8/1998 | Yamaguchi et al. | |
| 5,880,775 A | 3/1999 | Ross | |
| 5,929,580 A | 7/1999 | Mullet et al. | |
| 5,955,854 A | 9/1999 | Zhang et al. | |
| 5,963,000 A | 10/1999 | Tsutsumi et al. | |
| 5,990,938 A | 11/1999 | Bern | |
| 5,996,281 A | 12/1999 | Takano et al. | |
| 6,023,224 A | 2/2000 | Meyvis | |
| 6,051,829 A | 4/2000 | Full | |
| 6,084,367 A | 7/2000 | Landert | |
| 6,298,603 B1 | 10/2001 | Diaz | |
| 6,345,105 B1 * | 2/2002 | Nitta et al. | 382/100 |
| 6,347,486 B1 | 2/2002 | Badillet | |
| 6,418,235 B1 | 7/2002 | Morimoto et al. | |
| 6,429,893 B1 | 8/2002 | Xin | |
| 6,430,875 B1 | 8/2002 | Clark et al. | |
| 7,042,492 B2 * | 5/2006 | Spinelli | 348/143 |
| 2001/0045327 A1 | 11/2001 | Shemanske et al. | |
| 2001/0048470 A1 | 12/2001 | Lampert et al. | |
| 2002/0005899 A1 | 1/2002 | Fekas et al. | |

FOREIGN PATENT DOCUMENTS

| | | |
|---|---|---|
| DE | 195 22 760 A1 | 4/1997 |
| DE | 196 50 569 A1 | 6/1998 |
| EP | 799 962 | 10/1997 |
| EP | 0 852 313 | 7/1998 |
| EP | 0 853 299 A2 | 7/1998 |
| JP | 06-307157 | 11/1994 |
| JP | 08-136219 | 5/1996 |
| JP | 10-184187 | 7/1998 |

OTHER PUBLICATIONS

Office Action for Japanese Patent Application No. 2001-544463 issued Jun. 15, 2010.

* cited by examiner

AUTOMATIC DOOR ASSEMBLY WITH VIDEO IMAGING DEVICE

This application is a continuation of U.S. application Ser. No. 09/729,960, filed Dec. 6, 2000 now U.S. Pat. No. 7,042,492, which claims priority to Spinelli U.S. Provisional Application Ser. No. 60/169,977, filed Dec. 10, 1999 and Spinelli U.S. patent application Ser. No. 09/659,463. These applications are hereby incorporated into the present application in their entirety.

FIELD OF THE INVENTION

The present invention relates to an automatic door assembly for controlling access through a door opening. More particularly, the present invention relates to an automatic door assembly that incorporates the use of a video imaging device that detects the approach of persons and objects to the door assembly and responsively signals the operator of the door assembly to open the door panel(s) thereof.

BACKGROUND OF THE INVENTION

In commercial and industrial buildings, such as, for example, retail stores, factories, warehouses, etc., it is often desirable to provide a video surveillance system to monitor persons and events within the building. One of the key areas where it is desired to direct such video surveillance is at the doorways that permit entrance and exit to certain areas. This allows security personnel to monitor the comings and goings of individuals through the doorways.

In many commercial and industrial settings, there exists one or more doorways within a building provided with an automatic door assembly that automatically opens when a person approaches the doorway to permit entrance/exit therethrough. These automatic door assemblies typically use microwave doppler or active and passive infrared (IR) sensors to detect the motion of a person approaching the door. Also, some automatic door assemblies use pressure sensitive mats or electric eyes to determine the presence of a person in front of the door panel(s) thereof. Irrespective of which kind of sensor is used, when a sensor determines that a person is approaching the doorway, the controller of the door assembly responsively signals a door operator thereof to move the door panel(s) to the open position thereof to permit passage therethrough.

In arrangements wherein a video surveillance device is being used to monitor a doorway in which an automatic door assembly is installed, the surveillance imaging device is mounted at a vantage point that provides a view of the persons travelling through the doorway while, at the same time, sensors on the door assembly are also monitoring the areas adjacent to or within the doorway to detect the presence of motion indicative of persons travelling through the doorway. Thus, the building owner is paying for the costs of two systems that function to some extent to monitor a doorway. Also, the imaging device that monitors the doorway and the door assembly itself are typically installed by different companies, thereby increasing installation costs.

Consequently, there exists a need in the art for an arrangement wherein video imaging capabilities and sensing capabilities that determine the presence or approach of a person to a doorway controlled by an automatic door assembly are combined into one convenient package that can be easily installed to provide effective door assembly operation and video imaging functions.

SUMMARY OF THE INVENTION

In one embodiment, the present invention provides an automatic door assembly for installation at a doorway formed through a wall of a building and for use in conjunction with a video device that is (a) capable of receiving a video data signal from a video imaging device monitoring a field of view and (b) processing the video data signal received from the imaging device into a form suitable for displaying images that are visually representative of the imaging device's field of view. The door assembly comprises a frame assembly that mounts to the building wall at the doorway thereof, a door panel that mounts to the frame assembly for movement between closed position and open positions, and a door controlling system.

In another embodiment, the door controlling system comprises a video imaging device mounted in a viewing position. The imaging device may be provided by a digital or analog video camera. In the viewing position, the imaging device monitors a field of view that encompasses at least an approach area located adjacent to the doorway. The video imaging device transmits an internal video data signal comprising information representative of the field of view. The controlling system also comprises a detection system comprising a video signal processor that communicates with the video imaging device. The processor receives the internal video data signal from the imaging device and processes the information comprising the internal video data signal to determine whether a person or object has entered the approach area. The detection system transmits a door opening signal in response to the processor thereof determining that a person or object has entered the approach area. The door assembly also comprises a door operator connected to the door panel and communicated with the detection system. The door operator moves the door panel from the closed position thereof to the open position thereof responsive to receiving the door opening signal.

The detection system may comprise both the processor and a standard door controller. The door controller would be of the type known in the art that is capable of monitoring the position of the door panel structure via a feedback mechanism and varying the amplitude or frequency of the door opening signal to control the speed at which the door operator opens the door panel(s). For example, it is usually desired to move the door panel relatively slowly at or near the fully opened and closed positions thereof and relatively faster in the middle of its travel path. In this arrangement, the processor generates a detection signal and transmits the same to the controller. Then the controller responsively generates and transmits the appropriate door opening signal to the operator based on the position of the door panel. In fact, if the door panel is already in the fully open position thereof, the controller may ignore the detection signal and not transmit any door opening signal to save on wear and tear of the operator. Alternatively, the functions of the controller may be built into the processor.

The door controlling system may be adapted to transmit an external video data signal comprising information representative of the field of view of the imaging device. This would enable the door controlling system to be communicated to the aforesaid video device so that the video device can process the external video data signal into a form suitable for displaying images that are visually representative of the field of view of the video imaging device including the approach area adjacent the doorway. Such a video device may include a video display device such as a video monitor or a video data storing device that stores the information for later retrieval and review in conjunction with a video display monitor.

The terms internal and external are used with respect to the video data signals to emphasize the fact that the internal signal remains internal to the door assembly and is used by the door controlling system while the external system is output externally of the door assembly to the video device. As a result, the door assembly of the present invention provides the functions and advantages of a video imaging device and the door controlling functions of a typical door assembly into one convenient package. This convenience can be greatly appreciated by establishments that monitor their doorways with video surveillance because the provision of the video imaging device on the door assembly eliminates the need for separately purchasing and installing a video imaging device for monitoring the doorway.

In prior art arrangements, such as those disclosed in U.S. Pat. Nos. 4,914,859 and 4,565,029, a number of individual energy emitters and detectors are provided in the assembly to provide coverage for the travel area of the door panel structure. The '859 patent relates to a sliding door assembly and the '029 patent relates to a swing door assembly. Each of these assemblies uses a position sensor to determine the position of the door panel structure between the open and closed positions thereof. In each of these assemblies, the processor selectively activates and deactivates the individual detectors as needed to ensure that movements of the door panel structure do not trigger the detectors and responsively cause generation of a door opening signal. These designs, however, are expensive because of the costs associated with obtaining and installing multiple individual detectors, and the increased design costs associated with integrating each of the detectors into the overall system design. Also, the use of multiple detectors introduces additional points for malfunctions.

Another aspect of the invention provides an automatic door assembly for installation at a doorway formed through a wall of a building. This aspect of the invention comprises a frame assembly constructed and arranged to be mounted to the building wall at the doorway thereof. A door panel is constructed and arranged to be mounted to the frame assembly for movement between (1) a closed position wherein the door panel is positioned in covering relation over the doorway to prevent persons and objects from travelling therethrough and (2) an open position wherein the door panel is moved out of the covering relation to permit persons and objects to travel through the doorway. A door controlling system comprises a video imaging device constructed and arranged to be mounted in a viewing position wherein the imaging device monitors a field of view that encompasses at least a door panel travel area through which the door panel moves during movement thereof between the open and closed positions. The video imaging device is adapted to transmit a video data signal comprising information representative of the field of view. The door controlling system also comprises a detection system comprising a video signal processor that communicates with the video imaging device. The video signal processor is adapted to receive the video data signal from the imaging device and to process the information comprising the internal video data signal to determine whether a person or object is in the door panel structure travel area. The detection system is adapted such that the processor ignores the movement of the door panel within the door panel travel area so that the door panel is not determined by the processor to be a person or object in the predetermined area. The detection system is also adapted to responsively transmit a door opening signal in response to the processor thereof determining that a person or object is within the door panel travel area. A door operator is constructed and arranged to be connected to the door panel and adapted to communicate with the detection system. The door operator is constructed and arranged to move the door panel from the closed position thereof to the open position thereof through the door panel travel area responsive to receiving the door opening signal.

The assembly of this aspect of the invention is advantageous because the travel area of the door panel can be properly monitored by an imaging device without the costs and complexities associated with continually activating and deactivating multiple sensors as in the prior art arrangements.

Other objects, features, and advantages of the present invention will become apparent from the following detailed description, the accompanying drawings, and the appended claims.

DETAILED DESCRIPTION OF THE INVENTION

Figure 1:
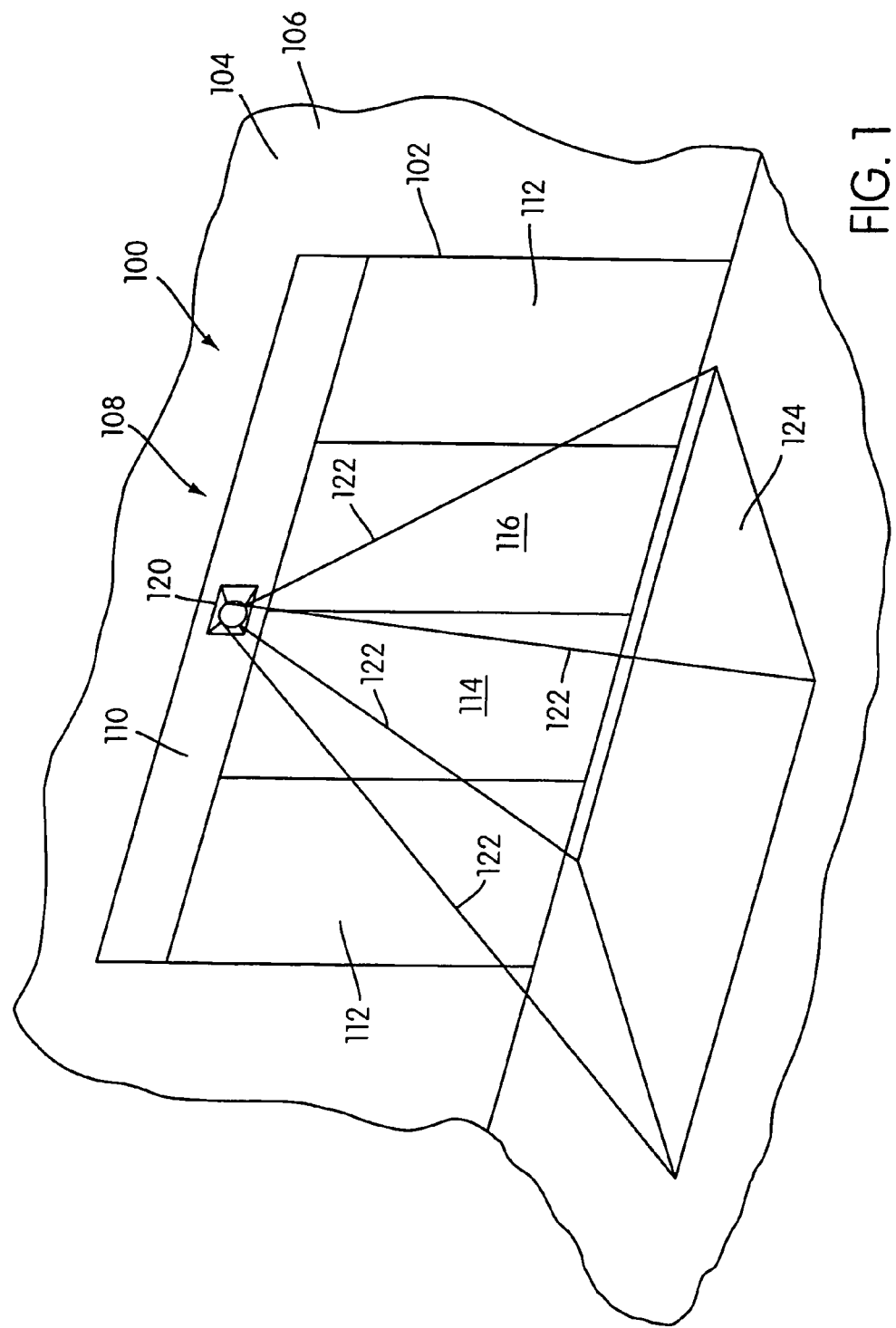
FIG. 1 is a perspective view of a sliding door assembly installed in a wall of a building, the door assembly having a video camera provided thereon in accordance with the principles of the present invention.

FIG. 1 is a perspective view of a sliding door assembly, generally indicated at 100, mounted within a doorway 102 of a wall 104 of a building 106, the remainder of the building being cut-away around the doorway 102. The door assembly 100 comprises a frame assembly, generally indicated at 108, that mounts within the doorway 102. The frame assembly 102 comprises a header 110 that houses the door operator (shown schematically at 16 in FIG. 2) and the door controlling system (shown schematically at 10 in FIG. 2) that controls the door operator 16, which system 10 will be described in more detail hereinbelow as being the focus of the present application. The frame assembly 108 also comprises a pair of non-sliding panels 112 that cover opposing sides of the doorway 102.

The door assembly 100 further comprises door panel structure in the form of a pair of sliding door panels 114, 116 that move rectilinearly between open and closed positions. In the closed position thereof, the door panels 114, 116 are positioned in covering relation over the portions of the doorway 102 that are not covered by the non-sliding panels 112 to prevent the travel of persons and objects therethrough. In the open position thereof, the door panels 114, 116 are moved out of covering relation with respect to the doorway 102 to permit the travel of persons and objects through the doorway 102.

The door operator 16 may be of any known construction, such as hydraulic or electromechanical, and connects to door panel carriers (not shown) that are housed inside the header 110. Each of the door panels 114, 116 are individually mounted to these door panel carriers and the carriers roll or slide in a rectilinear manner within the header 110 toward or away from one another to provide the door panels 114, 116 with their movement between the open and closed positions thereof. The use of such door panel carriers is well-known in the art and will not be detailed herein. The door operator 16 operates to move the door panel carriers away and towards one another to affect the movement of the door panels 114, 116 between the open and closed positions thereof.

In accordance with the principles of the present invention the door assembly 100 also comprises a video imaging device (shown schematically at 26 in FIG. 2) housed within a video camera 120 that is mounted in a viewing position to the outwardly facing surface of the header 110. In this viewing position, the imaging device 26 of the camera 120 has a field of view as demarcated by lines 122 that encompasses an approach area 124 disposed adjacent to the doorway 102. This enables the imaging device 26 to monitor approach area 124. It is contemplated that the imaging device's field of view may also encompass the doorway 102 itself (i.e., the threshold area). This enables the device 26 to monitor both the approach area 124 for persons approaching the doorway and the threshold area within the doorway 102 itself for persons stopped and standing therein. The role and function of the imaging device 26 is explained in further detail hereinbelow.

Figure 2:
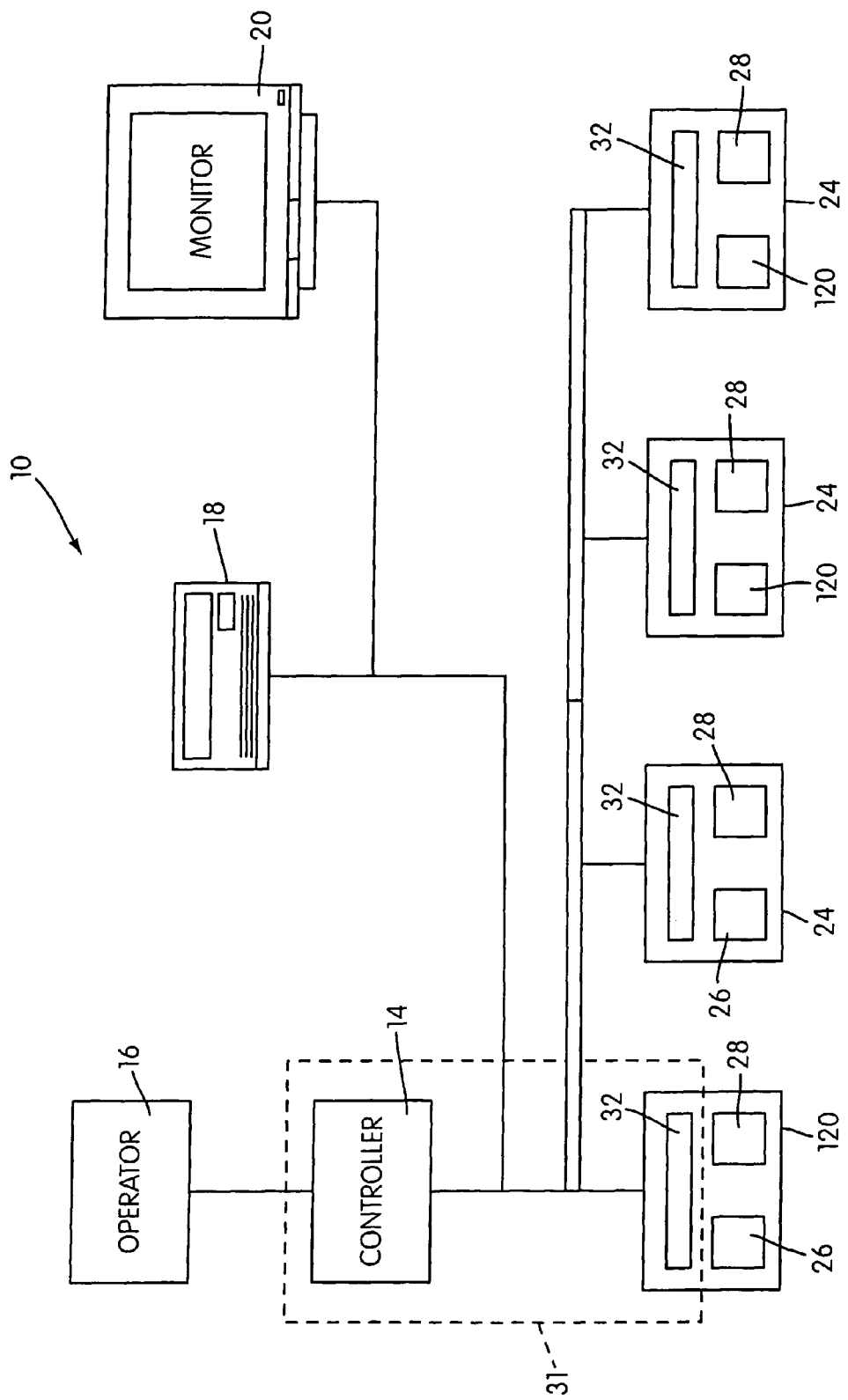
FIG. 2 is a schematic illustration of the components that communicate with the video camera provided on the door assembly.

FIG. 2 schematically illustrates the general concepts and arrangement of the present invention. The door controlling system, generally indicated at 10, is housed within the header 110 (FIG. 1) and communicates with the door operator, which is indicated schematically in this FIG. 2 at 16. The door controlling system 10 has one or more video imaging units, each indicated at 26 and housed within video cameras similar to video camera 120 shown in FIG. 1. The door controlling system 10 also comprises a motion detection sub-system 31. This sub-system 31 comprises one or more video cameras 120 and a door controller 14 that communicates with the operator 16. Each of the cameras 120 houses a processor 32 that is adapted to generate a motion detection signal and transmit the signal to the controller 14 in a manner that is described in further detail hereinbelow. The door controller 14 is adapted to generate a door opening signal and transmit the signal to the operator 16 in a manner that is described in further detail hereinbelow.

In the arrangement illustrated in FIG. 2, there are a plurality of video cameras. Each of the cameras 120 has an electronic video imaging device 26, preferably in the form of a digital video imaging device.

For the sake of simplicity, the manner in which the door controlling system operates will be described under the assumption that only one camera 120, and thus only one video imaging device 26 and one processor 32, is being used. The signal processor 32 receives and processes video data from the video imaging device 26. More specifically, the video imaging device 26 generates and transmits an internal video data signal comprising information representative of its field of view. This internal video data signal is received by the processor 32 and processed or evaluated to determine whether a person or object has entered into the approach area. The specific way in which the processor 32 makes this determination will be described in further detail below. When the processor 32 determines that a person or object has entered the approach area 24, the processor 32 generates and transmits a motion detection signal to the controller 14, which in turn transmits a door opening signal to the door operator 16 (assuming the door panels 114, 116 are not already in the open position thereof).

The controller 14 may be of any type known in the art. Such a controller 14 would treat the motion detection signal from the processor 32 in the same manner as it would if it were a motion detection signal that was transmitted from other well known motion or presence detection systems, such as IR or microwave doppler sensors. As is well-known in the art, the controller 14 monitors the position of the door controller 14 and uses that information to vary the amplitude or frequency of the door opening signal to affect faster or slower movement of the door panel(s). For example, it is usually desirable that the door operator 16 moves the door panel(s) slower at or near the fully opened and closed positions thereof. The controller 14 monitors the position of the door panel(s) using the same well-known Hall effect sensor arrangement that is described hereinbelow. The controller 14 may also be adapted to wait a predetermined period of time after the processor has ceased generating and transmitting the motion detection signal and then generate and transmit a door closing signal to the operator 16.

Alternatively, the use of a separate controller and a separate processor may be obviated by using a single processor that performs the above-described functions of both the processor 32 and the controller 14.

To determine whether an object or person has entered the approach area monitored by the video imaging device 26, the processor 32 processes or evaluates the information comprising the internal video data signal in accordance with known algorithms in order to detect movement of a person or object in or into the imaging device's the field of view. For example, an image frame taken at one time may be stored and compared with a subsequent image frame taken at a later time. In the case of a digital image, a pixel-by-pixel comparison may be performed between the two images. In that case, if a pixel has a different image value in the subsequent image than in the earlier image, a change in pixel value is tallied for that pixel. If a large object, such as a person, moves between the time of the earlier image, and the subsequent image, then a large number of pixels will register as having different values between the two images.

To distinguish between small pixel changes due to noise, which is almost always present at some level, a detection threshold value is set. When the number of pixels registering as having different values exceeds the set detection threshold value, the processor 32 responsively treats that as motion and transmits the motion detection signal to the controller 14. The detection threshold value can be set at a higher value to eliminate detection of small objects, such as paper blown through the field of view by the wind or other such debris, or small animals such as insects, small birds, and squirrels that may move through the field of view. Preferably, the detection threshold value is set to a value at which motion of a small child is detected. Preferably, motion of a 28" tall child that is approximately 10" wide and approximately 6" deep and moving at between 3.2 inches per second to 2.5 feet per second is detected. In addition, the detection threshold may be set such that partially solid objects such as wire frame or plastic shopping carts are detected.

In another embodiment of the invention, the processor 32 filters out the background image and distinguishes certain moving objects from a person or people approaching the automatic door. In the case of background filtering, background objects will typically be stationary on a time scale which is long compared to the time it takes for a person to walk into the view of a video imaging device, and to pass through the automatic door and travel out of the field of view of the opposing video imaging device. For example, blowing paper or leaves may blow into the field of view, and then remain steady for many minutes, hours or even days. Objects may be rearranged and moved, for example, relocating a trashcan within the field of view. Changing weather conditions, such as snow, may present relatively fixed background images.

In an arrangement wherein a plurality of imaging devices 26 are used, such as the arrangement in FIG. 2, each of the imaging devices 26 generates and transmits an internal video data signal to its associated processor 32. Each processor 32 processes or evaluates its respective signal to determine whether a person or object has entered into any of the areas monitored by the imaging devices 26. When one of these processors 32 determines that a person or object has entered one of these monitored areas 24, that processor 32 generates and transmits a motion detection signal to the controller 14, which in turn transmits a door opening signal to the door operator 16 (assuming the door panels 114, 116 are not already in the open position thereof).

In the preferred embodiment, a black-and-white digital camera that employs CCD elements for image pickup is used to provide the video imaging device(s) 26. The invention anticipates using color video imaging devices in other embodiments. Furthermore, the invention is not limited to only digital imaging devices. Analog video cameras may be used in other embodiments of the invention.

The camera 120 may LED indicators 28 that provide information on the operational status of the master camera 22 and its imaging device 26 during the installation, operation and/or maintenance thereof.

The camera(s) 120 are selectively attached to portions of an automatic door assembly and/or structures immediately adjacent thereto. The number of cameras 120 used and their particular placement will depend on the particular type of automatic door assembly and, in some cases, on the size of the door. The most common applications may be categorized as sliding doors, swinging doors, and bi-fold doors. In the case of swing doors, there are four common types of swing doors encountered: uni-directional single door, uni-directional double door, bi-directional single door, and bi-directional double door.

The video imaging device(s) 26 of the door controlling system are also communicated to a remotely located external video device that is capable of processing a video data signal received from a video imaging device 26 into a form that is suitable for displaying images that are visually representative of the imaging device's field of view. In the arrangement wherein more than one imaging device 26 is provided in the door controlling system 10, only the video data signal from one imaging device 26 will be transmitted as the external video data signal to the external video device; although it may be desirable to transmit external video data signals from two or more of the imaging devices 26 of one controlling system 10 that have significantly different fields of view. Alternatively, the external video signals from a plurality of imaging devices 26 may be transmitted to a single video device for simultaneous viewing or storage and subsequent viewing with the fields of view being shown in "split screen" fashion. This external video data signal may be transmitted to the external video device directly from the imaging device 26 that generates it in parallel with the processor or it may be transmitted to the external video device indirectly through the video processor 32 in series therewith. Like the internal video data signal (which may be digital or analog), the external video data signal (which may be digital or analog) comprises information that is visually representative of the imaging device's field of view.

The external video device may be a video data storing device, shown at 18, that is capable of processing a video data signal and storing the same for later use in conjunction with a display device, thereby allowing events taking place in the camera's field of view to be reviewed at a later time. The video data storing device 18 is preferably a high-capacity unit, but may generally be selected from a wide range of available semiconductor storage devices, magnetic storage devices, or optical storage media, such as flash memories, hard drives, removable magnetic media, recordable CD, recordable DVD disks, or standard VHS VCR tape, for example.

A further preferred feature of the video data storing device 18 is that it is adapted to record only when motion is detected in the field of view of the imaging device 26 from which the external video data signal is derived. To accomplish this, each processor 32 is communicated to the activating device of the storing device 18 and transmits the same motion detection signal that it transmits to the controller 14. Alternatively, the controller 14 may be communicated to the activating device of the storing device 18 so that the controller 14 activates the storage device 18 responsive to receiving the motion detection signal from one of the processors. The storing device 18 normally stays inactive and does not record or otherwise store the external video signal transmitted thereto. However, when the activating device thereof receives the motion detection signal, or a corresponding signal from the controller 14 its activates the video storing device 18, which in turn begins recording or storing the external video data signal. For further details concerning this feature, reference may be made to U.S. Pat. Nos. 5,602,585 and 5,880,775, the entirety of each of which is hereby incorporated into the present application by reference.

Alternatively, the external video device may be a video display device in the form of one or more video monitors, shown at 20. The monitor 20 may be viewed by security personnel to track the travel of persons and objects through the doorway 102. In a future application, the monitor 20 may be located at a remote service location and be communicated with the door controlling system 10 via a digital or analog network. This could enable a service or repair technician to visually verify the operational condition of the door assembly (assuming an imaging device on the door assembly has pertinent portions such as the door panel(s) within its field of view) prior to travelling to the location of the door assembly 100. This can reduce the need for travelling of the repair technician to handle problems that he could easily instruct on-site persons to handle over the telephone while viewing their activities on the monitor 20.

In a preferred embodiment of the invention the processor 32 distinguishes between particular "known" moving objects and other moving objects. In particular, the processor 32 recognizes detection of the moving door panel(s) themselves and ignores such movement. That is, the processor 32 detects the motion of a door panel within a field of view of an imaging device, but does not generate a motion detecting signal in response to such motion.

One exemplary way to accomplish this is to generate a look-up table of data. However, the invention also anticipates using algorithms to recognize known moving objects instead of, or in addition to, look-up tables of data. In generating a look-up table, a table of motion data corresponding to a motion map for the moving door panel(s) is generated in correlation with known motion and positions of the door panel(s). Preferably, sensors are placed on components, which move in correlation with the motion of the door. A suitable feedback mechanism that may be used is disclosed in U.S. Pat. No. 4,565,029, the entirety of which is hereby incorporated into the present application by reference.

The feed back mechanism may also have two Hall effect transistors positioned on a circuit board that is fastened to the rear of the motor housing used to effect opening and closing of the door. The motor shaft protrudes through the rear of the motor housing where a small magnetically-charged disk having four poles spaced 90° from one another is fastened to the motor shaft. As the motor rotates, the magnetic disk rotates causing four magnetic fields, each created by one of the poles and alternating between positive and negative, to pass alongside the two Hall effect transistors. The transistors are positioned substantially along a circular arc relative to the axis of rotation 22½° out-of-phase from each other. A power source is connected to the transistors, and the transistors act as switches that close momentarily each time a magnetic pole passes alongside the two transistors. This results in two separate periodic waveforms from the transistor-magnetic field configuration, each of which is generated by a respective one of the sensors. The two waveforms are substantially identical squarewaves having two values that may be referred to a high and low and are 22½° out-of-phase with each other due to the relative positioning of the transistors along the path of rotation.

The two waveforms are transmitted to the processor 32 either directly or indirectly via the controller 14. The two waveforms output from the feedback mechanism are utilized by the processor to determine the position, direction, and speed of the moving door. Generally, the position and direction of motion of the door are of greater interest than the speed of the door.

Figure 4:
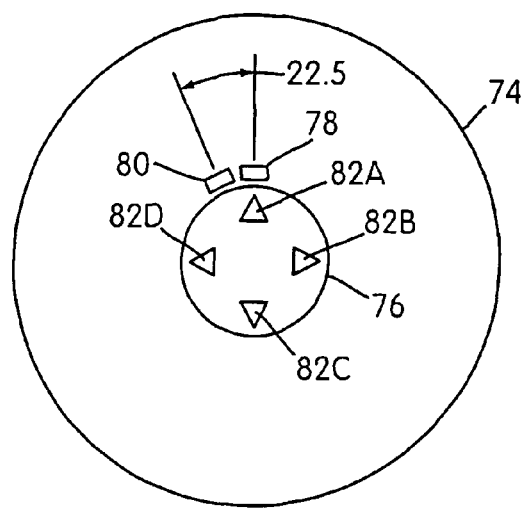
FIG. 4 is a schematic illustration of components of a feedback mechanism for door positions and motion.

FIG. 4 is a schematic drawing illustrating an example of such a feedback mechanism. It should be understood that this arrangement is only provided as an illustrative example and is not intended to be limiting. The motor has a motor housing 74 and a rotating shaft 76 protruding through the rear of the motor housing 74. Two Hall effect transistors 78 and 80 are disposed substantially 22½° apart on an arc substantially centered on an axis of rotation of the motor shaft 76. A magnetic disk on the motor shaft 76 creates a periodic magnetic field, which actuates the Hall effect transistors 78 and 80. The four poles on the shaft are marked 82A, 82B, 82C, and 82D, and alternate between positive and negative poles. When each positive pole 82A, 82C is proximate either Hall effect transistor 78, 82 it causes the signal of that transistor to switch from a low state to a high state. Likewise, when each negative pole 82B, 82D is proximate either transistor 78, 80 it causes the signal of that transistor to switch from a high state to a low state. This process repeats itself as the motor shaft 76 rotates through successive revolutions.

Figure 5:
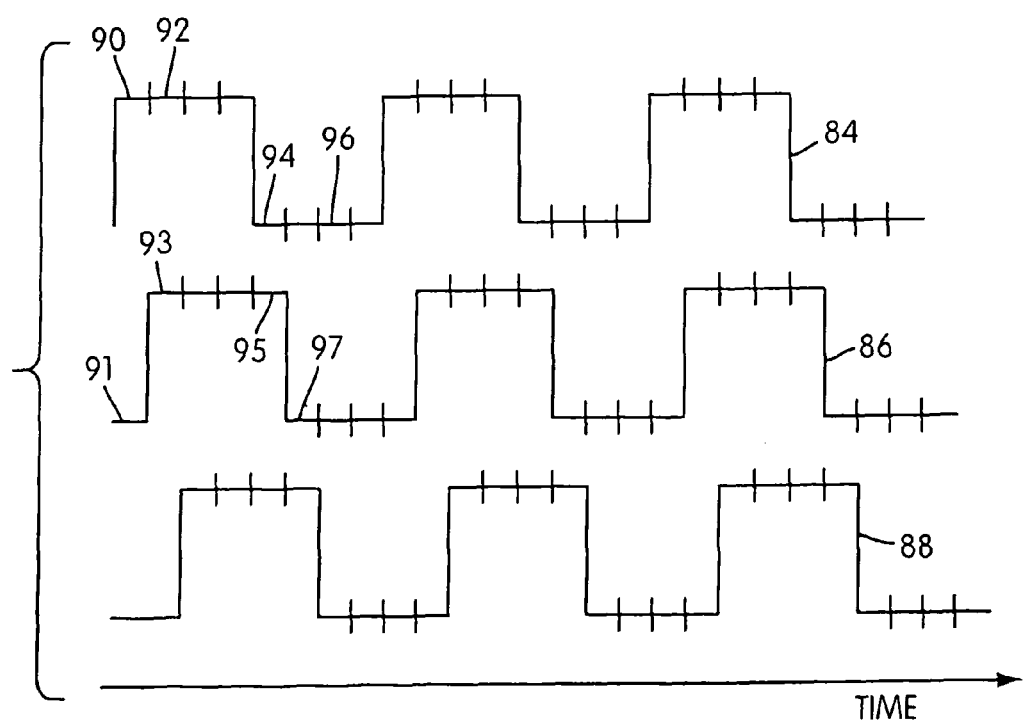
FIG. 5 illustrates the general features of signals output from the feedback mechanism of FIG. 4.

The output signal created by this action is illustrated in FIG. 5 at 84. FIG. 5 also illustrates the signal 86 output from the Hall effect transistor 80, which it should be noted is 22½° out of phase with signal 84. For the time axis going from left to right in FIG. 5, the signal output 86 from Hall effect 80 transistor remains low for a 22½° turn of the shaft 76 after the output signal 84 from the Hall effect transistor 78 is switched to a high value. After the 22½° rotation of the motor shaft 76, the positive pole 82A is then proximate the Hall effect transistor 80 thus causing the signal 86 to switch from a low value to a high value. The signal 86 remains at a high value for another 90° turn of the motor shaft 76 until negative pole 82B is proximate transistor 80. However, before that occurs, after 67½° the negative pole 82B passes proximate to the Hall effect transistor 78, and thus it switches the signal 84 thereof to a low value while the signal 86 from the Hall effect transistor 80 remains at a high value.

One may think of each value of the squarewaves 84 and 86 as having four portions, each corresponding to a 22½° rotation of the motor shaft 76. Thus, the signal 86 lags the signal 84 by 22½° for rotations of the motor shaft 76 in the counterclockwise direction such that each successive pole 82A, B, C, D rotates from the Hall effect transistor 78 counterclockwise to the Hall effect transistor 80. In other words, each transition from a high value to a low value or a low value to a high value of the signal 84 occurs in one of the above-mentioned units prior to a transition of the signal 86 from a low value to a high value or a high value to a low value.

In the case where the motor shaft 76 rotates in the clockwise direction, the signal from the Hall effect transistor 80 is represented in FIG. 5 by signal 88. In this case, transitions from a high value to a low value or a low value to a high value of the signal 88 lags corresponding transitions of the signal 84 by 22½° because each pole 82A, B, C, D passes proximate transistor 80 prior to transistor 78. Consequently, the asymmetry and the positioning of the Hall effect transistors 78 and 80, permit one to determine the direction of rotation by the relative phase of signals output from Hall effect transistor 78 relative to Hall effect transistor 80. Although the Hall effect transistors 78 and 80 are shown as being placed about 22½° out of phase with each other in the counterclockwise rotation direction, one skilled in the art should recognize that phase differences other than 22½° may also be used. One is not limited to only two Hall effect transistors, but this is preferable for simplicity and cost effectiveness.

In operation, as the door moves the two waveforms from the Hall effect transistors 78 and 80, respectively, continue to propagate and change state from low to high or high to low, depending on the previous state. The processor 32 evaluates both waveforms simultaneously. In FIG. 5, signal 84 is initially in a high state 90 while the signal 86 is in the low state 91. As the door moves in a particular direction, for example, forward or open, corresponding to counterclockwise rotation of motor shaft 76, the waveform 84 at state 93 remains at a high value while for a signal 86, it transitions for a high value 94. The processor 32 compares signals 84 and 86 at portions 90 and 91 corresponding to high-low values as compared to portions 92 and 93 corresponding to high-high values. This change is said to be a state transition and state transitions only occur while a door is in motion.

As the door continues to move, the controller will process additional state transitions, such as comparing portions 94 to 95 and 96 to 98, corresponding to low-high values and low-low values. This process is continued for succeeding transitions. The processor 32 recognizes any transition of states of door motion. In the preferred embodiment, there are two separate algorithms to determine the actual door position, and the direction of travel.

In regard to the door position, when the door assembly is initially powered up, the door panel moves very slowly to the full open position which is defined as the zero position. As the door starts to close, the two output waveforms 84 and 86 are generated and transmitted to the processor 32 (or processors 32 in the arrangement with more than one camera 120). The processor 32 logs each transition of either signal 84, 86 into its memory as a state change. The first state change as the door panel moves in the door closing direction from the aforesaid zero position is assigned the position number 1 and the second state change in the door closing direction is assigned position number two and so on. In other words, each successive state change as the door panel moves in the closing direction thereof is assigned a position number that increases incrementally by 1 until the door reaches the fully closed position. As the door begins to reopen, the transitions are again logged and the position number is decreased each time a state transition is reached. This algorithm of identifying and logging transitions permits the processor to recognize length of travel of the door, but not the direction of travel. However, the processor 32 also evaluates the state changes to determine the type of state change. A high-low state is always followed by a high-high state in the door opening direction, and a high-high state is always followed by a low-high state in the same door opening direction. Conversely, a high-low state is always followed by a low-low state in the door closing direction, and this low-low state is then followed by a low-high state in the door closing direction. These state change differences may be reversed. Thus, when a state change is detected and the processor determines that it is a state change that corresponds to movement in the door opening direction, the processor increases the position number by 1. Conversely, when a state change is detected and the processor determines that it is a state change that corresponds to movement in the door closing direction, the processor decreases the position number by 1. As a result, because the processor continually evaluates these feedback signals 84 and 86 for both distance and direction of travel, the processor always "knows" the position of the door panel as defined by its position number.

The number of positions will vary depending on the type of door set up, size of motor and gearbox configuration, etc. For a 90° swing door, there are approximately 640 positions between full open and full closed which translates to roughly 7 positions per degree of door travel. For sliding doors, there are roughly 14 positions per inch of travel. This again depends on the motor/gearbox configuration and the timing belt pulley circumference and other mechanical components.

In order for the automatic door to recognize detected motion of the door as being distinguishable from the motion of a person, the video sensor system performs what may be viewed as a learn mode. During the initial power-up cycle of the door system, the door position and travel direction is established and monitored. In addition to this, the processor 32 (or processors 32 in the arrangement with more than one camera 120) also goes through a learn phase. During the learn phase, care is taken to ensure that other moving objects do not corrupt the data taken during the learn phase. The door is moved from the full open position to the full closed position. While this occurs, the video sensor system logs the door position number in memory along with information demarcating the area within the camera's field of view in which the door panel is located and moving. The process continues for each and every door position. This generates a look up table that has a information concerning the location of the door panel with the imaging device's field of view for each and every position of the door panel.

During operation of the door assembly, as the processor evaluates the internal video data signal from a video imaging device, it looks to the look up table generated during the learn mode. By looking at the look up table, the processor 32 (or processors 32) determines the area where the door panel is in the imaging device's field of view and ignores motion in that area. The area of door motion is said to be masked so that during normal door operation the masked area will be insensitive to motion for as long as the door panel is in the specific position stored in a look-up table accessed by the controller. As the door moves to another position, the masked area is removed so that the same area will then be sensitive to motion occurring within the previously masked area. After the door has moved, there is then a new masked area associated with the new door position, which is again insensitive to motion.

Although the above described masked areas as being sensitive and insensitive to motion, other embodiments include recognizing the appearance of new objects in addition to moving objects. For example, a person who is motionless within the swing path of a swinging door or within the slide path of the sliding door will be recognized in this embodiment as being different from the pre-established background image. Again, during the learn mode of the processor 32 (or processors 32), the field of view is learned in the sense that background images are stored in a look-up table, thus permitting later comparison to determine significant changes to the background image during normal door operation. This is often referred to as "presence" sensing.

In addition to a learn mode to learn motion and/or video image of a door, one may perform a learn mode to generate a look-up table, or otherwise provide an algorithm, such that other objects besides the door panels can be ignored. For example, in an automatic door which has imaging devices having a view of moving vehicle traffic can generate a look-up table in a learn mode in order to ignore the moving vehicle traffic.

The above describes features of preferred embodiments of this invention which may be combined with conventional door actuators and door controllers to provide visual sensors and surveillance. Video detection, recording and processing equipment is commercially available. For example, the SILENT WITNESS® video surveillance systems provide video motion detection and tracking capability which may be programmed and integrated into the video sensor and surveillance system according to the instant invention.

Also, one could use cameras similar to those available from Philips Electronics, such as Model Nos. VC7A775T, VC7A795T, LTC0140, LTC0330, LTC0350, TC590, LTC0500. It should be understood, however, that the present invention contemplates using any kind of imaging device or camera and should not be limited to these examples of commercially available ones.

Figure 3B:
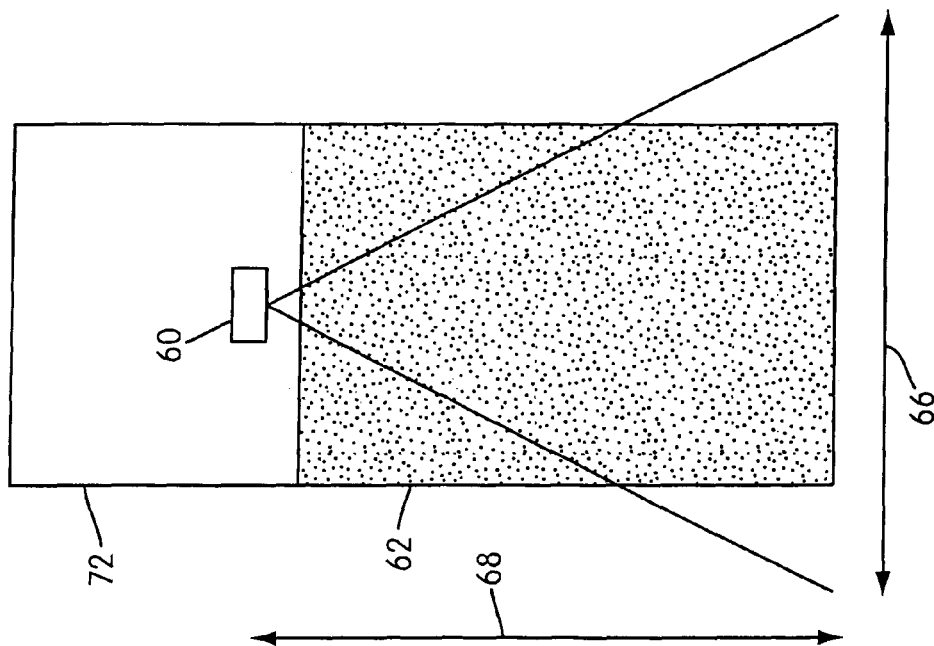
FIGS. 3A and 3B are schematic illustrations showing the placement and orientation of video imaging devices according to a preferred embodiment of the invention.
Figure 3A:
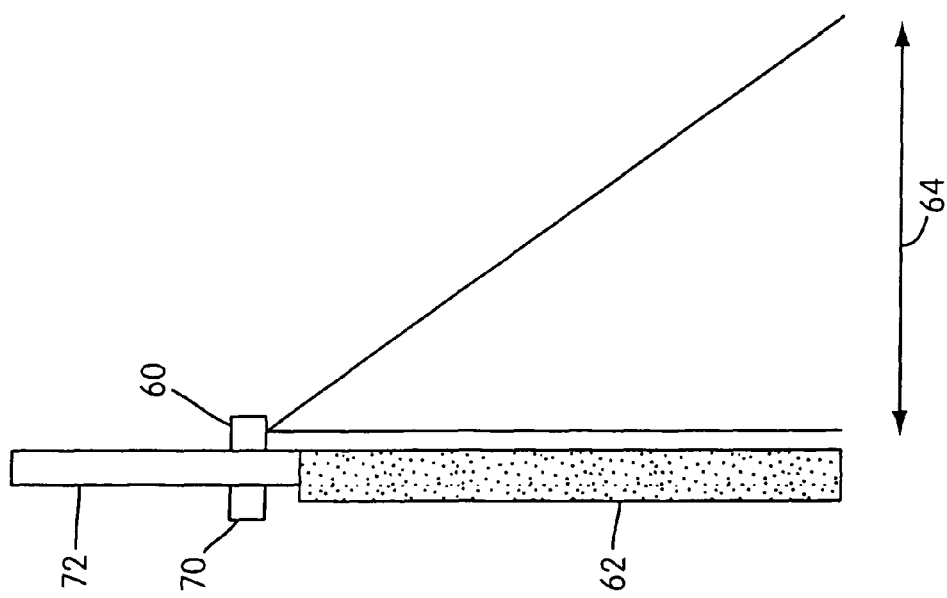

FIGS. 3A and 3B illustrate side and front views, respectively, of a field of view of a video imaging device 60 in an automatic sliding door 62 according to a preferred embodiment of this invention. The field of view has a forward vision distance 64 and a vision width 66. Preferably, the viewing direction of the video imaging device 60 is adjustable at the time of installation and maintenance. More preferably, the direction of view of the video imaging device 60 is adjustable with three axes of rotation at the time of installation and maintenance.

In the case of a single sliding door, as illustrated in FIGS. 3A and 3B, one video imaging device 60 may be sufficient to both open the sliding door 62 and maintain the sliding door 62 in an open position while a person passes through the portal, if people approach from only one direction. More typically, people will approach the automatic door illustrated in FIGS. 3A and 3B from both directions. To detect people approaching from both directions, a second video imaging device 70 is attached to an opposing side of the wall 72 compared to the video imaging device 60. Although FIGS. 3A and 3B illustrate a single sliding door 62, typically two video imaging devices per each side being monitored may be needed to provide adequate coverage for the approach area on one side of the wall in the case of wide double sliding doors. In the case of the sliding doors, all of the video imaging devices, such as video imaging devices 60 and 70 would provide both approach detection and threshold protection to maintain the sliding doors open while a person is still within the doorway.

It will thus be understood that the objects of the present invention have been fully and effectively achieved. The foregoing specific embodiments have been provided to illustrate the structural and functional differences of the present invention and are not intended to be limiting. To the contrary, the present invention is intended to encompass all modifications, alterations and substitutions within the spirit and scope of the appended claims.

The invention claimed is:

1. A door controlling system comprising:
   a video imaging device that monitors at least a door panel and a door panel travel area through which said door panel moves between said open and closed positions, said video imaging device being operable to receive images of the door panel within the door travel area;

a detection system comprising a video signal processor and a memory, said video signal processor capable of communicating with said video imaging device, said memory containing a plurality of stored initial images of the door panel within the door travel area, each of said stored initial images corresponding to one of a plurality of positions of the door panel within the door travel area;

a door operator constructed and arranged to be operatively connected to said door panel and adapted to communicate with said detection system, said door operator operable to move the door panel between the open and closed positions through the door panel travel area;

a position sensor communicated to said detection system for monitoring the positions of the door panel within the door panel travel area; and the detection system operable to determine whether a person or object other than the door panel is within the door panel travel area by comparing the images of the field of view, including the door panel therein, against the stored initial images of the door panel within the door travel area for the corresponding positions of the door panel as monitored by the position sensor.

2. A door controlling system according to claim 1, wherein said field of view encompasses an approach area located adjacent to and extending away from said door assembly, said video signal processor being adapted to process said video data signal to determine whether a person or object is in said approach area, said detection system being adapted to responsively transmit said door opening signal in response to said processor thereof determining that a person or object is within said approach area.

3. A door controlling system according to claim 1, wherein said position sensor is a Hall effect sensor.

4. A door controlling system according to claim 1, wherein said door controlling system is adapted to transmit an external video data signal comprising information representative of the images received by said imaging device, thus enabling the external video data signal to be transmitted to a video device so that the video device can process the external video data signal into a form suitable for displaying images that are visually representative of the images received by the video imaging device.

5. A method for controlling a door panel, comprising:
monitoring with a video imaging device positions of a door panel within a door panel travel area through which the door panel travels, and generating signals based on said monitoring of the positions of the door panel;
monitoring with a position sensor positions of the door panel within the door travel area;
determining whether a person or object other than the door panel is within the door panel travel area with a processor by comparing the signals against initial stored images of the door panel within the door travel area stored in a memory, said stored images corresponding to positions of the door panel as monitored by the position sensor;
responsive to determining that a person or object other than the door panel is within the door travel area, transmitting a door opening signal.

6. An automatic door assembly, comprising: a video device that is capable of (a) receiving a video data signal comprising information representative of images received by a video imaging device and (b) processing the video data signal into a form suitable for displaying images that are visually representative of the images received by the imaging device;

a door panel constructed and arranged to be mounted for movement between a closed position and an open position;

a door controlling system comprising:
(i) a video imaging device constructed and arranged to be mounted in a viewing position wherein said imaging device monitors a field of view that encompasses at least an approach area located adjacent to the door panel, said video imaging device being operable to monitor the field of view by receiving images of the field of view and transmitting an internal video data signal comprising information representative of said images;
(ii) a detection system comprising a video signal processor that communicates with said video imaging device, said video signal processor being adapted to receive said internal video data signal from said imaging device and to process said internal video data signal to determine whether a person or object has entered said approach area, said detection system being adapted to responsively transmit a door opening signal in response to said processor thereof determining that a person or object has entered said approach area; and a door operator constructed and arranged to be connected to said door panel and adapted to communicate with said detection system, said door operator being constructed and arranged to move said door panel from said closed position thereof to said open position thereof responsive to receiving said door opening signal;

said door controlling system being adapted to transmit an external video data signal comprising information representative of the images received by said imaging device, thereby enabling the external video data signal to be transmitted to the aforesaid video device so that the video device can process the external video data signal into a form suitable for displaying images that are visually representative of the images received by said video imaging device including at least the approach area adjacent said door panel said video imaging device comprising a video camera system that transmits signals that are used for both (a) said internal video signal that comprises information representative of said images transmitted to said video signal processor for determining whether a person or object has entered said approach area, to enable said detection system to transmit the door opening signal, and (b) said external video data signal to be transmitted to said video device that processes the external video data signal into a form suitable for displaying said images that are visually representative of the images received by said video camera system.

7. An automatic door assembly according to claim 6, wherein said video imaging device is a digital video imaging device.

8. An automatic door assembly according to claim 6, wherein said door controlling system further comprises a door controller communicated with both said signal processor and said door operator and wherein said video signal processor is adapted to generate a detection signal and transmit said detection signal to said controller in response to determining that a person or object has entered said approach area;

said door controller being adapted to generate and transmit said door opening signal to said operator responsive to receiving said detection signal;

said controller being adapted to (a) monitor the positioning of said door panel between said open and closed positions thereof and (b) select a speed at which said operator moves door panel moves based on the said positioning of said door panel and to responsively control said operator to move said door panel at said selected speed by varying an amplitude or frequency of said door opening signal.

9. An automatic door assembly according to claim 8, wherein said processor determines whether a person or object has entered said approach area by detecting motion of the person or object within said approach area.

10. An automatic door assembly according to claim 6, wherein said processor determines whether a person or object has entered said approach area by detecting motion of the person or object within said approach area.

11. An automatic door assembly according to claim 6, wherein said door panel is a single sliding door panel movable generally rectilinearly within a threshold area of said doorway.

12. An automatic door assembly according to claim 6, wherein said door panel is one of a pair of sliding door panels movable generally rectilinearly towards and away from one another within a threshold area of said doorway.

13. An automatic door assembly according to claim 6, wherein said video camera system comprising a visible light spectrum video camera.

* * * * *